W. F. BOUCHER.
Transparent Slate-Frames.

No. 135,315. Patented Jan. 28, 1873.

Witnesses:
Jacob E. Schiedt
Millard F. Walton

Inventor:
W<sup>m</sup> F. Boucher,
by John A. Wiedersheim
Attys.

UNITED STATES PATENT OFFICE.

WILLIAM F. BOUCHER, OF PHILADELPHIA, PENNSYLVANIA.

IMPROVEMENT IN TRANSPARENT-SLATE FRAMES.

Specification forming part of Letters Patent No. 135,315, dated January 28, 1873.

*To all whom it may concern:*

Be it known that I, WILLIAM F. BOUCHER, of the city and county of Philadelphia and State of Pennsylvania, have invented a new and useful Improvement in Slates; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1:
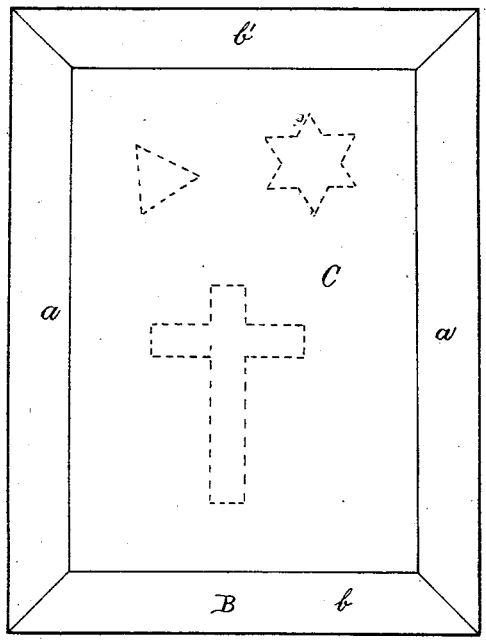
Figure 2:
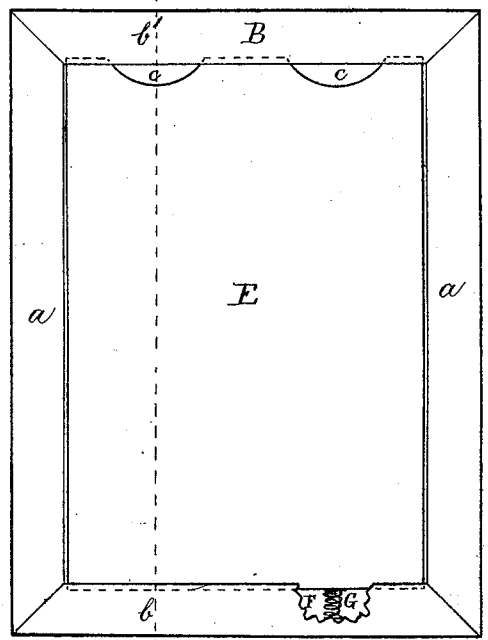
Figure 3:
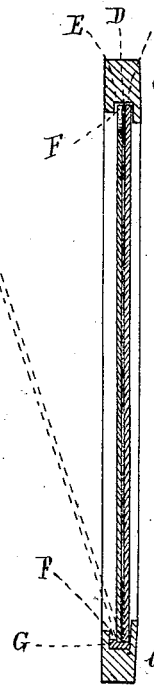

Figure 1 is a face view of the device embodying my invention. Fig. 2 is a rear view thereof, partly broken away. Fig. 3 is a section in line $x\ x$, Fig. 2.

Similar letters of reference indicate corresponding parts in the several figures.

This invention relates to the class of slates generally known as "transparent," which are used for tracing on glass or similar transparent substance cuts, sketches, or pictures placed behind the same, and for business purposes wherein sheets with lines or columns ruled for various counting-house, office, or book-keeping requirements are placed behind the glass so that items, memorandums, &c., may be noted or written on the glass relatively to the lines or columns on the sheets. The written matter may be readily erased and the glass cleansed, as is well known.

In the transparent slates now in use the glass and paper, muslin, or other articles employed behind the glass are held in the frame by a back board, on which is pivoted a buckle or turning bar whose ends are adapted to enter openings in the frame-work. The buckle often becomes loose, as the back board is thin and affords slight hold for the pivot of the buckle. Said buckle also frequently accidentally turns, and the pictures, glass, and board fall out of the frame, the same being a source of inconvenience and cause of destruction of the glass. My invention is designed to remedy these defects; and consists in adapting the back board to enter grooves in the frame in connection with one or more springs for retaining the board in said grooves, whereby the removable portions of the slate are firmly held in place with uniform pressure, and without liability of loss or accidental release of parts, and projecting and weak portions are entirely obviated.

Referring to the drawing, A represents a transparent slate, of which B is the frame; C, the glass; D, the picture or sheet; and E, the back board. The glass and back board E are of width equal to that of the space between the inner edges of the sides $a$ of the frame B, but in length larger than the space between the inner edges of the sides $b\ b'$. F represents grooves or channels, which are formed on the inner faces of the sides $b\ b'$ of the frame B, and receive the ends of the back board in the direction of its length, the insertion or introduction of which is permitted, owing to the grooves increasing the space beyond the inner edges of the sides $b\ b'$. In the groove F of side $b$ I insert one or more springs, G, which bear against or rest on the base of said groove, and may be constructed of metal, rubber, or other suitable material.

The operation is as follows: The proper end of the glass is inserted at the back of the frame in the groove in which the spring is arranged and pressed in against the spring until the other end of said glass clears the inner edge of the side $b'$ of the frame. The glass is now pressed toward the front of the frame until it comes in line with the groove of side $b'$. Then the spring causes the glass to move into said groove, and the edge of the latter and of the other groove overlaps the edges of the glass. The pictures or sheets are now laid on the glass and the back board placed thereon and applied to the frame in a manner similar to the manipulation of the glass, whereby the various removable members of the slate are securely held in position, and without liability to breakage of the glass or injurious strain on the parts, owing to the elastic nature of the spring-fastening. To remove the board it is only necessary to press the same toward the spring end of the frame until the edge of the other end is cleared by the board, when the latter may be drawn out and easily disengaged from the frame, the operation of which may be facilitated by openings $c$ for the engagement of the fingers of the person using the slate. In the same manner I accomplish the removal of the glass. The board may be displaced without disturbing the glass—an advantage which is apparent, from the fact that pictures or sheets can be withdrawn without danger of the falling or dropping out of the glass, and the consequent breakage thereof, or subsequent inconvenience of replacing the same.

It will be seen that there are no projecting parts or weak points in the device, and that the pressure of the pictures or sheet on the glass due to the back board is uniform throughout, wrinkles and gatherings being thereby avoided.

Having thus described my invention, what I claim as new, and desire to secure by Letters Patent, is—

1. In a transparent slate, the combination, with the frame, of one or more springs operating to hold the writing-glass and back board in the frame, substantially as set forth.

2. The frame B with grooves F, the lengthened glass C, back board E, and one or more springs, G, combined and operating substantially as set forth.

The above signed by me this 10th day of December, 1872.

WILLIAM F. BOUCHER.

Witnesses:
JOHN A. WIEDERSHEIM,
MILLARD F. WALTON.